(12) United States Patent
Pulling et al.

(10) Patent No.: US 12,556,427 B2
(45) Date of Patent: Feb. 17, 2026

(54) NETWORK ROUTER WITH CUSTOMIZABLE RADIO CONFIGURATIONS

(71) Applicant: Tyco Fire & Security GmbH, Neuhausen am Rheinfall (CH)

(72) Inventors: David L. Pulling, San Jose, CA (US); Scott Lincke, San Carlos, CA (US); David Laone, Milwaukee, WI (US); Tazmin Pirani, Toronto (CA); Greg Mora, Tomball, TX (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 293 days.

(21) Appl. No.: 18/449,376

(22) Filed: Aug. 14, 2023

(65) Prior Publication Data

US 2024/0106675 A1   Mar. 28, 2024

Related U.S. Application Data

(60) Provisional application No. 63/377,292, filed on Sep. 27, 2022.

(51) Int. Cl.
*H04L 12/28* (2006.01)
*H04W 84/12* (2009.01)

(52) U.S. Cl.
CPC ......... *H04L 12/2898* (2013.01); *H04W 84/12* (2013.01)

(58) Field of Classification Search
CPC ... H04W 12/069; H04W 40/02; H04W 76/12; H04W 92/02; H04W 84/042; H04W 84/12; H04L 63/0892; H04L 45/60; H04L 12/2898
See application file for complete search history.

(56) References Cited

U.S. PATENT DOCUMENTS

| | | |
|---|---|---|
| 10,621,840 B2 | 4/2020 | Garg et al. |
| 2015/0052578 A1 | 2/2015 | Yau et al. |

FOREIGN PATENT DOCUMENTS

CN    105553794 B    3/2019

OTHER PUBLICATIONS

International Search Report and Written Opinion in PCT/US2023/072228, mailed Nov. 29, 2023, 15 pages.

*Primary Examiner* — Jung Liu
(74) *Attorney, Agent, or Firm* — ArentFox Schiff LLP

(57) ABSTRACT

Example implementations include a method, apparatus, and computer-readable medium for a wireless router. The router includes a first radio frequency (RF) modem and a hardware card slot configured to receive an RF modem card configured to communicate according to a second RF protocol with one or more electronic devices. The router is configured to identify first events based on the traffic on a first WLAN protocol; translate the input received from the one or more electronic devices to a feature of a device profile; identify second events based on input received from the one or more electronic devices via the second RF protocol; generate a command to control a first device of the wireless devices or the electronic devices based on the device; and translate the command from the device profile of the first device to the first WLAN protocol or the second RF protocol.

18 Claims, 4 Drawing Sheets

NETWORK ROUTER WITH CUSTOMIZABLE RADIO CONFIGURATIONS

CROSS-REFERENCE TO RELATED APPLICATIONS

This application claims priority to U.S. Provisional Application No. 63/377,292 titled "NETWORK ROUTER WITH CUSTOMIZABLE RADIO CONFIGURATIONS," filed Sep. 27, 2022, which is assigned to the assignee hereof, and incorporated herein by reference in its entirety.

FIELD

The present disclosure relates generally to router configuration systems and methods.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a wireless router, including: a first radio frequency (RF) modem configured to route traffic among one or more wireless devices according to a first wireless local area network (WLAN) protocol, wherein the traffic includes Internet protocol traffic and the wireless router is configured to provide Internet access to the one or more first devices; at least one hardware card slot configured to receive an RF modem card configured to communicate according to a second RF protocol with one or more second devices, the RF modem card configured to execute a service application to communicate with the one or more second devices via the second RF protocol; a rules engine configured to: identify first events based on the traffic on the first WLAN protocol; identify second events based on input received from the one or more electronic devices via the second RF protocol; and generate a command to control a target device of the first devices or the second devices based on a device profile of the first device; and a translation layer configured to: translate the input received from the one or more second devices to the device profile of the target device; translate the command from the device profile of the first device to the first WLAN protocol or the second RF protocol.

In some aspects, the techniques described herein relate to a wireless router, wherein the rules engine is configurable via one or more of the wireless devices with one or more rules defining conditions based on the first events or the second events and defining actions based on commands included in the device profile.

In some aspects, the techniques described herein relate to a wireless router, wherein the rules engine includes a machine learning model configured to detect the first event based on a classification of the traffic on the first WLAN protocol.

In some aspects, the techniques described herein relate to a wireless router, wherein the rules engine includes a machine learning model configured to detect the first event based on an anomaly in traffic patterns on the first WLAN protocol.

In some aspects, the techniques described herein relate to a wireless router, wherein the device profile of the first device includes a feature set selected from generic features applicable to a plurality of devices.

In some aspects, the techniques described herein relate to a wireless router, wherein the device profile of the first device identifies an interface with the first RF modem or the RF modem card via which the first device is connected to the wireless router.

In some aspects, the techniques described herein relate to a method of operating a wireless router, including: routing traffic among one or more first devices according to a first wireless local area network (WLAN) protocol, wherein the traffic includes Internet protocol traffic and the wireless router is configured to provide Internet access to the one or more first devices; identifying a first event based on the traffic on the first WLAN protocol; receiving input from one or more second devices via a removable RF modem card, wherein the RF modem card is configured to execute a service application to communicate with the one or more second devices via a second RF protocol; translating the input received from the one or more electronic devices to a feature of a corresponding device profile; identifying a second event based on the feature of the device profile corresponding to the one or more second devices; generating a command to control a target device of the first devices or the second devices based on a device profile of the target device; and translating the command from the device profile of the target device to the first WLAN protocol or the second RF protocol.

In some aspects, the techniques described herein relate to a wireless router including: a memory; and a processor communicatively coupled with the memory and configured to: route traffic among one or more first devices according to a first wireless local area network (WLAN) protocol, wherein the traffic includes Internet protocol traffic and the wireless router is configured to provide Internet access to the one or more first devices; identify a first event based on the traffic on the first WLAN protocol; receive input from one or more second devices via a removable RF modem card, wherein the RF modem card is configured to execute a service application to communicate with the one or more second devices via a second RF protocol; translate the input received from the one or more second devices to a feature of a device profile corresponding to the one or more second devices; identify a second event based on the feature of the device profile corresponding to the one or more second devices; generate a command to control a target device of the first devices or the second devices based on a device profile of the target device in response to the first event or the second event; and translate the command from the device profile of the target device to the first WLAN protocol or the second RF protocol.

In some aspects, the techniques described herein relate to a non-transitory computer-readable medium storing instructions executable by a processor of a wireless router, wherein the instructions, when executed, cause to the processor to: route traffic among one or more first devices according to a first wireless local area network (WLAN) protocol, wherein the traffic includes Internet protocol traffic and the wireless router is configured to provide Internet access to the one or more first devices; identify a first event based on the traffic on the first WLAN protocol; receive input from one or more second devices via a removable RF modem card, wherein the RF modem card is configured to execute a service application to communicate with the one or more second devices via a second RF protocol; translate the input received from the one or more second devices to a feature of a device profile corresponding to the one or more second devices; identify a second event based on the feature of the device profile corresponding to the one or more second devices; generate a command to control a target device of the first devices or the second devices based on a device profile of the target device in response to the first event or the second event; and translate the command from the device profile of the target device to the first WLAN protocol or the second RF protocol.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
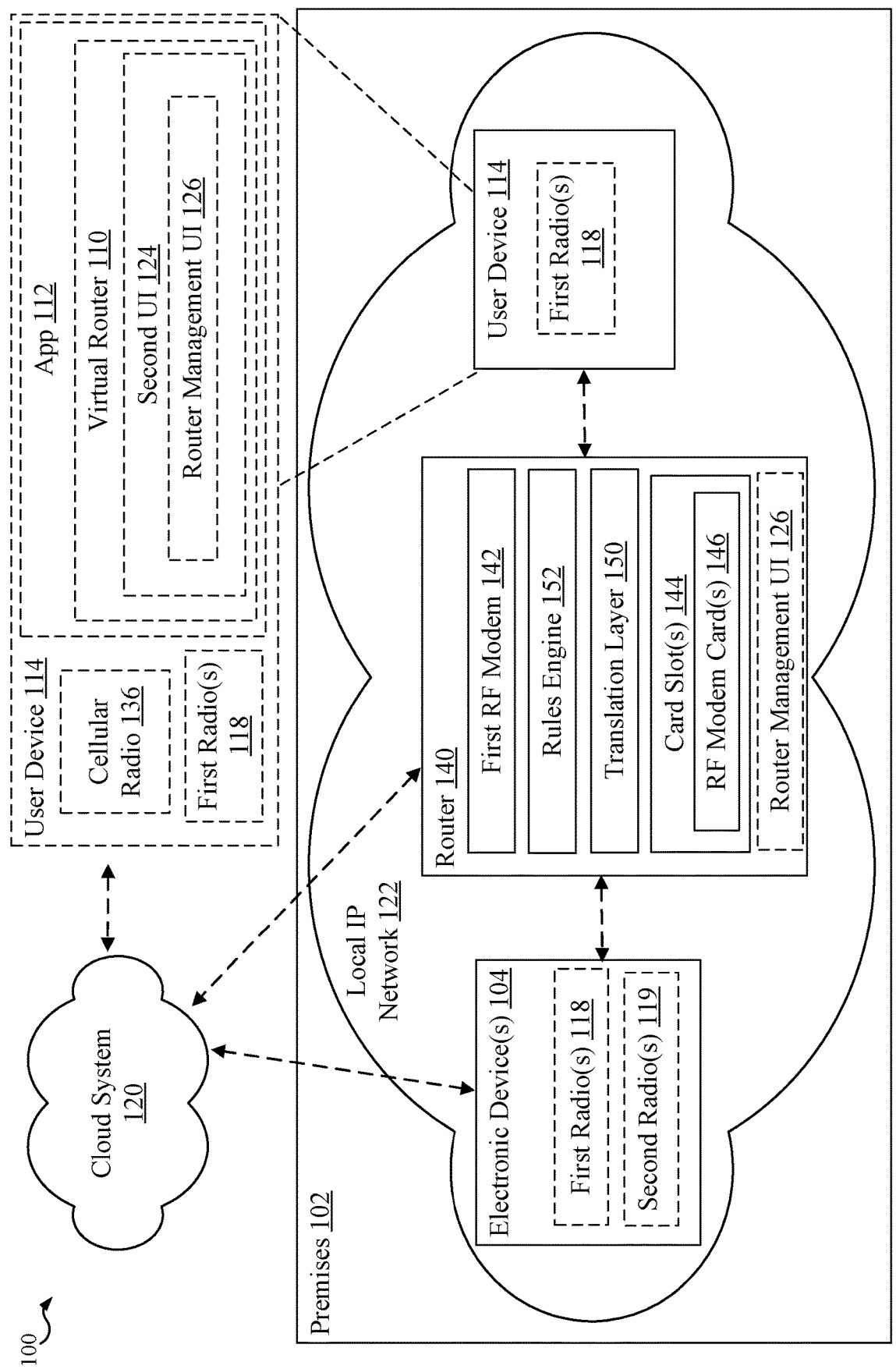
FIG. 1 is a schematic diagram of a router configured for providing a local internet protocol (IP) network and communicating with other electronic devices via a second RF protocol, according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

A premises may include a variety of electronic devices that communicate via various radio frequency (RF) protocols. For example, a home may include a wireless router that communicates with various devices to provide internet access. The home may also include various security devices that communicate with a security system (e.g., panel) via different RF protocols. In some cases, the security devices may include legacy devices configured to communicate with a dedicated security system that has been replaced or upgraded to a system using a different RF protocol. Additionally, smart home devices such as lights, speakers, appliances, etc. may communicate with the same or different RF protocols. Various features of such electronic devices may be restricted to dedicated systems or may become unavailable when a system is changed due to incompatibility of RF protocols.

Some aspects provide a wireless router with customizable radio configurations for communicating with other electronic devices via different protocols. The wireless router may be configured to route internet protocol (IP) traffic among one or more wireless devices according to a wireless local area network (WLAN) protocol. For example, the wireless router may implement a Wi-Fi router or access point (AP) according to an IEEE 802.11 specification. The wireless router may provide internet access to wireless devices such as smart phones, tablets, smart televisions, computers, etc. A wireless device may refer to any device capable of communicating via the WLAN protocol. The wireless router is further configured to communicate with electronic devices via at least one other wireless protocol. For example, the wireless router may include a hardware card slot configured to receive a radio-frequency (RF) modem card. The RF modem card may be referred to as a daughter card and may be configured for communications according to one or more RF protocols. Example RF protocols include: PowerG, SecurityRF (Including −319, −345, and −433 frequency versions), S-Line, Z-Wave, 345RF 2G, and Zigbee. Such RF protocols may be utilized by various electronic devices such as security devices, sensors, speakers, appliances, etc. An electronic device may refer to any device capable of communicating via an RF protocol other than the WLAN protocol. In some implementations, the other wireless protocol may not carry IP traffic or may not provide internet access to the electronic devices. Further, it should be understood that a device may be capable of communicating via multiple RF protocols. For instance, a device may communicate via both a WLAN protocol and an RF protocol such as PowerG.

Some present aspects provide for input from the devices connected via the one or more RF protocols to be analyzed along with information regarding devices connected via the WLAN protocol. The router may include a translation layer that translates input from the devices to a device profile. The device profile may include a feature set including a selection of generic features that are applicable to different devices. Accordingly, input from different devices (e.g., received via different protocols) may be translated into generic (e.g., not tied to a particular protocol) events. The router may include a rules engine that evaluates the events to determine whether the events satisfy conditions of configured rules. The configured rules may define conditions based on events detected by the connected devices and/or based on patterns of the traffic routed by the router. Accordingly, the router may allow integration of a variety of wireless devices and electronic devices into a single set of rules for triggering actions. The rules engine may generate commands for devices based on the triggered actions, and the translation layer may translate the commands to the respective protocol for the connected device based on the device profile.

In further alternative aspects, a router at a premises may be configured to provide at least some security/automation functionality at the premises. For example, a router at a premises may include one or more radios (e.g., Bluetooth, PowerG, Z-Wave, etc.) for communicating with one or more security/automation devices at the premises. In these aspects, the router may also include a cellular radio and may be operable to allow for a remote management system (e.g., a cloud system) to remotely connect to (or communicatively couple with) the router via the cellular radio to manage the configuration of the router and/or a local IP network supported by the router at the premises.

Turning now to the figures, example aspects are depicted with reference to one or more components described herein, where components in dashed lines may be optional.

Referring to FIG. 1, in one non-limiting aspect, for example, a router 140 at a premises 102 may be configured to interface an Internet Service Provider (ISP) via a modem to provide Internet connectivity over a local IP network 122 at the premises 102 (e.g., via Ethernet and/or Wi-Fi communication). For example, the local IP network 122 may be a wireless local area network (WLAN), and the router 140 may communicate via a WLAN protocol (e.g., Wi-Fi) using a first RF modem 142. For example, the first RF modem 142 may alternatively be referred to as a network interface controller (NIC). The local IP network 122 supported by the router 140 may provide Internet connectivity for various user devices 114 (e.g., personal computers, mobile devices, wearable devices, etc.) at the premises 102. The user device 114 may include a first radio 118 for communicating with the router via the WLAN protocol. The router 140 may also communicate with electronic devices 104 (e.g., security/automation devices such as cameras, door/window sensors, motion sensors, carbon monoxide detectors, smoke detectors, flood sensors, etc.) that are installed/positioned throughout the premises 102. In some cases, the electronic devices 104 may include a first radio 118 for communicating with the router via the WLAN protocol and/or a second radio 119 for communicating with the router via a second RF protocol.

In an aspect, the router 140 includes one or more card slots 144 that are configured to receive one or more RF modem card(s) 146. An RF modem card 146 may also be referred to as a daughter card or a smart RF card. An RF modem card 146 may be configured with a service application for a particular RF protocol. For instance, the service application may establish connectivity with electronic devices 104 and maintain a profile and/or address of each connected electronic device 104. The service application may include a protocol stack including, for example, one or more layers of the RF protocol and an application layer for the electronic device 104.

The router 140 may further include a translation layer 150 that is configured to translate between the second RF protocol and generic device profiles. A generic device profile may define features and/or events associated with an electronic device that are neutral with respect to an RF protocol. For example, a sensor device such as a smoke detector may be associated with a device profile including a feature set including a sensor type, input types (e.g., smoke detected or battery low), and actions (e.g., alarm or battery alert). The feature set for similar electronic devices 104 that communicate via different RF protocols may be the same. For instance, if the premises 102 includes two smoke detectors that communicate via different RF protocols, the device profile on the router 140 may include the same feature set for each of the smoke detectors. The translation layer 150 may translate a received input from an electronic device into a feature (e.g., a generic feature) of the device profile. For instance, the translation layer may receive a message (e.g., low battery) according to the protocol of the first smoke detector and translate the message into a generic low battery feature. Similarly, the translation layer 150 may translate a low battery message from the second smoke detector using a different protocol to the same generic low battery feature. The translation layer 150 may translate commands for the first device from the device profile of the first device to the first WLAN protocol or the second RF protocol applicable to the first device.

The router 140 may include a rules engine 152 configured to identify events and generate commands based on the events. For example, the router 140 may identify first events based on the traffic on the first WLAN protocol. For example, the router 140 may identify an active user device 114 based on traffic flows to or from the user device 114. The router 140 may also receive traffic including input or commands from a user device 114. The rules engine 152 may also identify second events based on input received from the one or more electronic devices 104 via the second RF protocol. For example, the rules engine 152 may identify alert events based on signals transmitted from sensors. In some implementations, the rules engine may operate on generic features of the electronic devices defined in the device profile. Accordingly, rules may be defined based on generic features rather than protocol specific messages. The rules engine 152 may generate a command to control a first device of the one of the wireless devices or the electronic devices based on a device profile of the first device. For example, the rules engine 152 may be configured match-action rules that define a condition based on events or feature and an action for the first device based on a feature of the first device. For instance, a rule may be configured to detect whether a user is present based on traffic to a user device 114 and detect a door open event from an electronic device such as a Zigbee door switch. When a door open event occurs and the user is not present, the rules engine may generate a command to perform an action such as sounding an alarm or sending a message to the user device 114.

In some aspects, the router 140 may be configurable and/or controllable via a router management UI 126 presentable on a control panel of the router. In some alternative or additional aspects, the router 140 may be configured and/or controlled via a second UI 124 of a virtual router 110 provided via an application (app) 112 executing on a user device 114 (e.g., a mobile device). In some aspects, the user device 114 may include a cellular radio 136 for communicating directly (e.g., via a cellular network) with the cloud system 120 to manage or control the router 140 at the premises 102, for example, via the router management UI 126 presentable on the user device 114. However, the present aspects are not so limited, and the user device 114 may communicate with the cloud system 120 via any other wired or wireless network/connection.

In an aspect, the cloud system 120 may communicate with the router to configure the router 140 and/or the local IP network 122 supported by the router 140 at the premises 102. For example, the cloud system 120 may configure a service set identifier (SSID), a Wi-Fi network ID, or a Wi-Fi network password for the local IP network 122, configure assignment of IP addresses over the local IP network 122, configure parental control over the local IP network 122, etc. The cloud system 120 may also communicate with the router 140 to configure the rules engine 152 and/or individual electronic devices 104 of the security/automation system 100 for communication over the local IP network 122 or the second RF protocol. For example, in an aspect, the router 140 may use one or more of the RF modem cards 146 (configured according to a protocol such as, e.g., PowerG, Z-wave, etc.) to wirelessly communicate with associated electronic devices 104. Using such radios/interfaces, the router 140 may configure electronic devices 104 of the security/automation system 100.

Figure 2:
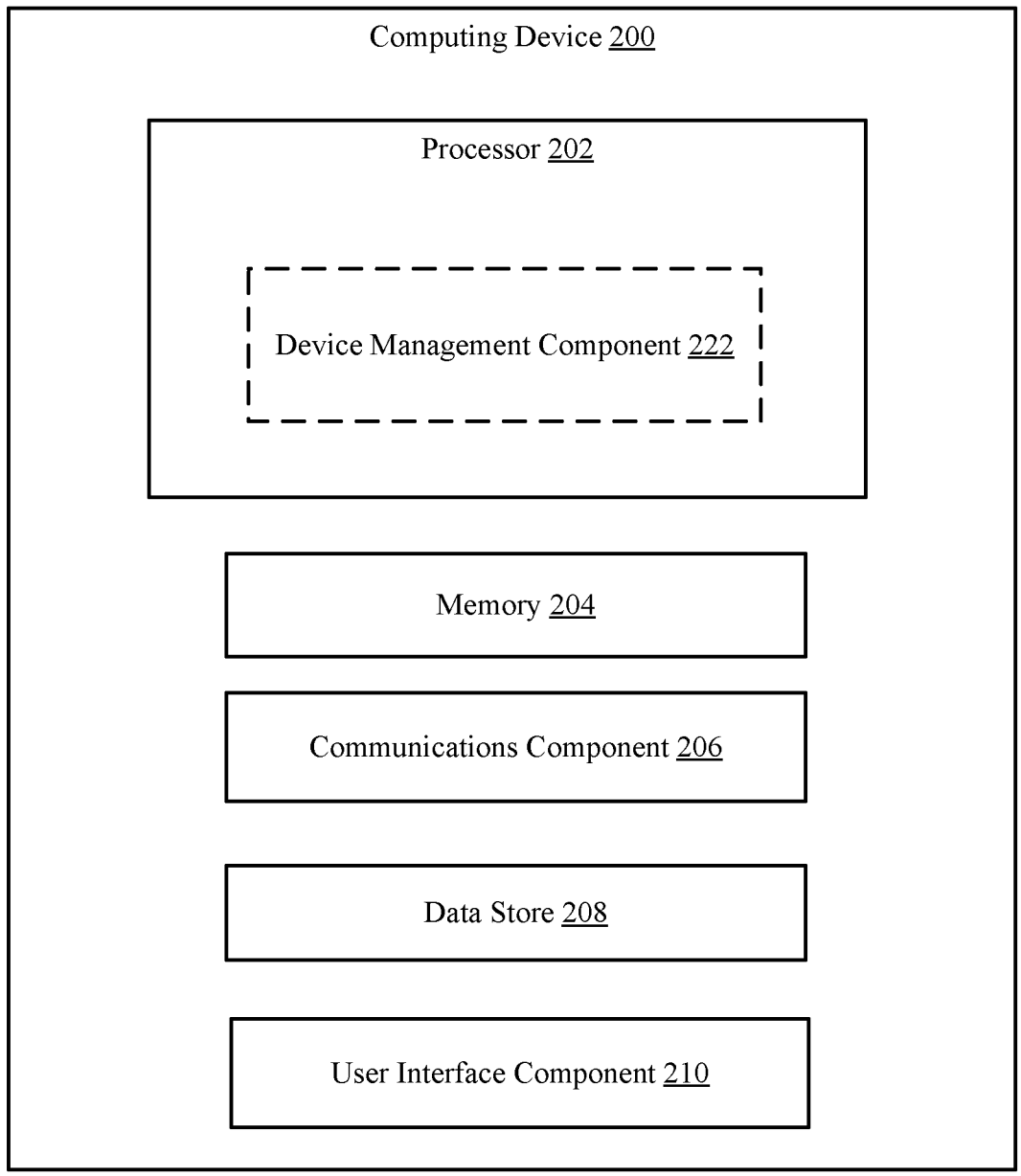
FIG. 2 is a block diagram of an example computing device which may implement all or a portion of any component or device in FIG. 1, according to some aspects.

FIG. 2 illustrates an example block diagram providing details of computing components in a computing device 200 that may implement all or a portion of one or more components in a control panel, a cloud system, a security/automation sensor or device, a user device (e.g., a smartphone, a tablet, a laptop computer, a desktop computer, etc.), a dedicated device, or any other component described above. The computing device 200 includes a processor 202 which may be configured to execute or implement software, hardware, and/or firmware modules that perform any functionality described above with reference to one or more components in a control panel, a cloud system, a security/automation sensor or device, a user device, a dedicated device, or any other component described above. For example, the processor 202 may be configured to execute a device management component 222 to provide device management functionality as described herein with reference to various aspects.

The processor 202 may be a micro-controller and/or may include a single or multiple set of processors or multi-core processors. Moreover, the processor 202 may be implemented as an integrated processing system and/or a distributed processing system. The computing device 200 may further include a memory 204, such as for storing local versions of applications being executed by the processor 202, related instructions, parameters, etc. The memory 204 may include a type of memory usable by a computer, such as random access memory (RAM), read only memory (ROM), tapes, flash drives, magnetic discs, optical discs, volatile memory, non-volatile memory (e.g., a non-transitory computer-readable medium storing instructions executable by the processor 202), and any combination thereof. Additionally, the processor 202 and the memory 204 may include and execute an operating system executing on the processor 202, one or more applications, display drivers, etc., and/or other components of the computing device 200.

Further, the computing device 200 may include a communications component 206 that provides for establishing and maintaining communications with one or more other devices, parties, entities, etc., utilizing hardware, software, and services. The communications component 206 may carry communications between components on the computing device 200, as well as between the computing device 200 and external devices, such as devices located across a communications network and/or devices serially or locally connected to the computing device 200. For example, the communications component 206 may include one or more buses, and may further include transmit chain components and receive chain components associated with a wireless or wired transmitter and receiver, respectively, operable for interfacing with external devices.

Additionally, the computing device 200 may include a data store 208, which can be any suitable combination of hardware and/or software, that provides for mass storage of information, databases, and programs. For example, the data store 208 may be or may include a data repository for applications and/or related parameters not currently being executed by the processor 202. In addition, the data store 208 may be a data repository for an operating system, application, display driver, etc., executing on the processor 202, and/or one or more other components of the computing device 200.

The computing device 200 may also include a user interface component 210 operable to receive inputs from a user of the computing device 200 and further operable to generate outputs for presentation to the user (e.g., via a display interface to a display device). The user interface component 210 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 210 may include one or more output devices, including but not limited to a display interface, a speaker, a haptic feedback mechanism, a printer, any other mechanism capable of presenting an output to a user, or any combination thereof.

Figure 3:
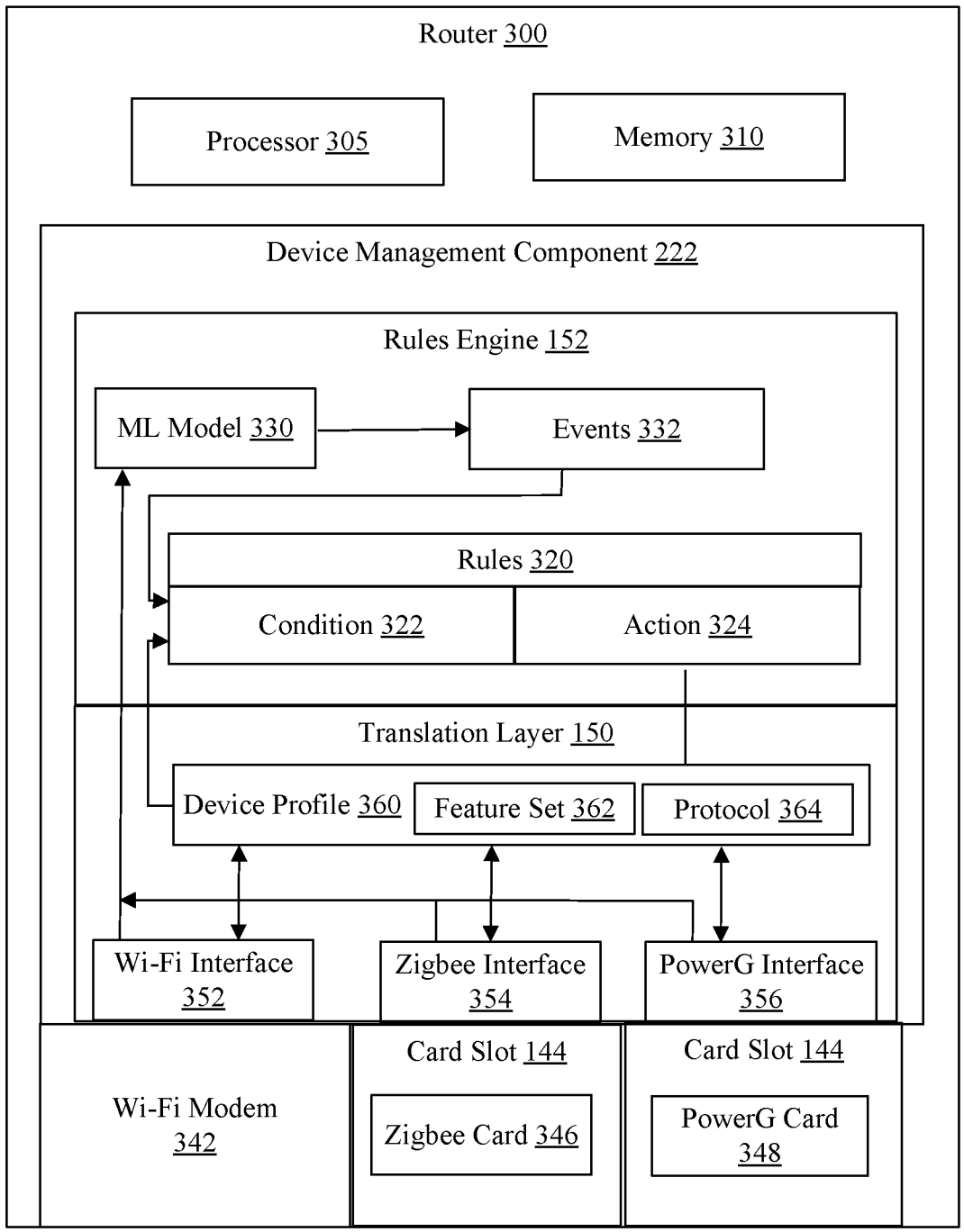
FIG. 3 is a block diagram of example components of a computing device which may implement all or a portion of a device configured for providing router functionality, according to some aspects.

Referring to FIG. 3, a router 300 may implement at least a portion of one or more components in FIGS. 1 and 2 above, such as all or at least a portion of router 140 for managing devices connected via different RF protocols. It should be noted that router 300, processor 305, and memory 310 may be the same or similar to computing device 200, processor 202, and memory 204 as described above with respect to FIG. 2.

In the illustrated example, the router 300 (e.g., a router) includes a Wi-Fi modem 342 (corresponding to first RF modem 142) and two card slots 144. The card slots 144 may include a Zigbee card 346 and a PowerG card 348, for example. The cards 346 and 348 may be changed to modem cards for other RF interfaces. In an aspect, Wi-Fi may be the primary RF protocol of the router 300. That is, the router 300 may use the Wi-Fi modem 342 to provide the local IP network 122. The router 300 may include native support for devices that connect to the router 300 via the Wi-Fi modem 342. The cards 346 and 348 may extend the functionality of the router 300 to other RF protocols. For example, the cards 346 and 348 may be selected based on the RF protocols of any electronic devices 104 to be managed by the local IP network.

The translation layer 150 may include an interface for each RF protocol. For instance, the translation layer 150 may include a Wi-Fi interface 352, a Zigbee interface 354, and a P-line interface 356. An interface may be a software component (e.g., a driver) executing on processor 305, that communicates with the respective modem. The interface may provide application layer objects for processing by the translation layer. For example, the Wi-Fi interface 352 may provide IP packets and the Zigbee interface 354 may provide Zigbee device objects. The translation layer 150 may be configured with a device profile 360 for each device connected to the router 300. For example, the device profile 360 may include a feature set 362 that defines events and actions associated with the device and a protocol 364 that defines the RF protocol of the device and related info (e.g., address). The events and/or actions of the feature set 362 may be common among different devices. That is, the input from different devices may generate a same type of event for analysis by the rules engine 152. Further, the rules engine 152 may generate an action 324 that may be performed by different devices. For example, the action 324 may be a command from the router 300 to the device. The translation layer 150 may translate the action to a specific message or signal according to the RF protocol of the device and transmit the message or signal via the respective interface and modem.

The rules engine 152 may include a set of rules 320 for determining actions of the router 300. For example, the rules 320 may be match action rules that may be configurable by a user via router management UI 126. The rules 320 may include a condition 322 and an action 324. In an aspect, the user may select the conditions 322 from the feature set 362 of connected devices. For example, the router management UI 126 may include a first menu of devices and a second menu of events for a selected device. Similarly, the router management UI 126 may present selectable actions based on the feature set 362 of connected devices. For instance, the actions may be generic actions for the types of devices connected to the router 300. In some implementations, the router management UI 126 may suggest rules based on connected devices and the user may select which suggested rules to activate.

In an aspect, the rules engine 152 may include one or more machine-learning (ML) models 330 configured to detect events 332. For example, a first ML model may classify Wi-Fi traffic for a device into classifications such as idle, browsing, or streaming. For instance, the first ML model may be trained by capturing packets while a user engages in various activities. The captured packets may be labeled with the activity to form a training set. The first ML model may be trained using supervised learning to accurately predict the activity based on the packets. The ML model 330 may output a detected category as an event 332, which may be set as a condition 322 for a rule 320. A second ML model may be an anomaly detector. For example, an anomaly detector may be trained using unsupervised learning techniques to detect deviations of traffic for a device from a usual pattern. In some implementations, the second ML model may be trained after deployment based on traffic patterns during operation. For instance, the anomaly detector may generate an anomaly event when an amount of incoming Wi-Fi traffic exceeds a normal amount of traffic at a time of day when the device is usually idle. As another example, the anomaly may include a traffic pattern indicative of a user or device attempting to join the network through brute-force key guessing (e.g., an unually large number of join requests). The ML model 330 may also be applied to input from the other RF protocols (e.g., from Zigbee card 346 or PowerG card 348). For example, the anomaly detector may detect failure of an electronic device 104 to send a report at a usual time. Accordingly, the ML model 330 may detect events that are related to electronic devices that are not explicitly signaled by the electronic device.

In a first example use case, a rule 320 may define a condition of an absence event for a user or user device (e.g., based on lack of Wi-Fi traffic or connectivity) and an open door to generate a warning notification to the user. In a second example use case, a rule 320 may define a condition of streaming data to a user device and a light in the room being on to generate an action to dim the light.

Figure 4:
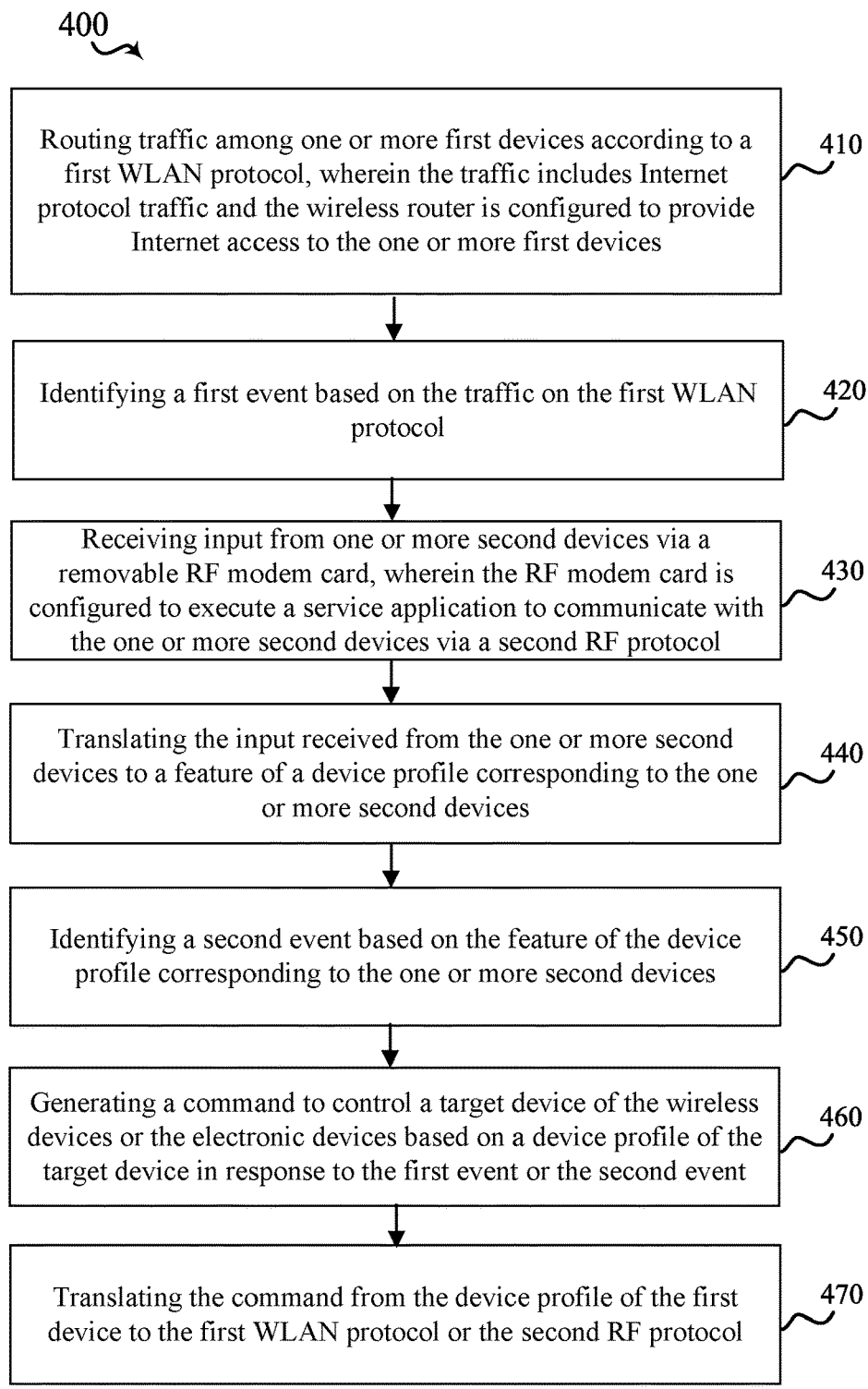
FIG. 4 is a flow diagram of an example method for providing router functionality, according to some aspects.

FIG. 4 is a flowchart of an example method 400 for managing devices connected to a router via different RF protocols. The router 140 or router 300 may perform the method 400 such as via execution of device management component 222, translation layer 150, or rules engine 152, by processor 305 and/or memory 310. For example, the memory 310 may store computer-executable code and the processor 305 may execute the computer-executable code to cause the router to perform the method 400. Specifically, router 300 may be configured to perform method 400 for communicating with devices via different RF protocols, as described herein.

At block 410, the method 400 includes routing traffic among one or more first devices according to a first WLAN protocol, wherein the traffic includes Internet protocol traffic and the wireless router is configured to provide Internet access to the one or more first devices. For example, in an aspect, router 300, processor 305, memory 310, device management component 222, and/or Wi-Fi Modem 335 may be configured to or may comprise means for routing traffic among one or more wireless devices (e.g., user devices 114) according to a first WLAN protocol. For instance, the Wi-Fi Modem 335 may route protocol data units (PDUs) based on media access control (MAC) addresses of the user devices 114.

At block 420, the method 400 includes identifying a first event based on the traffic on the first WLAN protocol. For example, in an aspect, router 300, processor 305, memory 310, device management component 222, rules engine 152, and/or ML model 330 may be configured to or may comprise means for identifying a first event based on the traffic on the first WLAN protocol. In some implementations, the block 420 may optionally include applying the traffic to a machine learning model 330 configured to detect the first event based on a classification of the traffic on the first WLAN protocol. As another example, in some implementations, the block 420 may optionally include applying the traffic to a machine learning model configured to detect the first event based on an anomaly in traffic patterns on the first WLAN protocol.

At block 430, the method 400 includes receiving input from one or more second devices via a removable RF modem card, wherein the RF modem card is configured to execute a service application to communicate with the one or more second devices via a second RF protocol. For example, in an aspect, router 300, processor 305, memory 310, device management component 222, and/or an interface 354, 356 may be configured to or may comprise means for receiving input from one or more second devices (e.g., electronic devices 104) via a removable RF modem card 146. The RF modem card 146 is configured to execute a service application to communicate with the one or more second devices via a second RF protocol. For instance, each removable RF modem card 146 may execute the service application to generate wireless messages (e.g., frames) according to the particular RF protocol.

At block 440, the method 400 includes translating the input received from the one or more second devices to a feature of a corresponding device profile corresponding to the one or more second devices. For example, in an aspect, router 300, processor 305, memory 310, device management component 222, and/or translation layer 150 may be configured to or may comprise means for translating the input received from the one or more second devices to a feature of a corresponding device profile 360.

At block 450, the method 400 includes identifying a second event based on the feature of the device profile corresponding to the one or more second devices. For example, in an aspect, router 300, processor 305, memory 310, device management component 222, and/or rules engine 152 may be configured to or may comprise means for identifying the second event based on the feature of the device profile corresponding to the one or more second devices.

At block 460, the method 400 includes generating a command to control a target device of the first devices or the second devices based on a device profile of the target device. For example, in an aspect, router 300, processor 305, memory 310, device management component 222, and/or rules engine 152 may be configured to or may comprise means for generating a command (e.g., action 324) to control the target device of the first devices or the second devices based on the device profile of the target device.

At block 470, the method 400 includes translating the command from the device profile of the target device to the first WLAN protocol or the second RF protocol. For example, in an aspect, router 300, processor 305, memory 310, device management component 222, and/or translation layer 150 may be configured to or may comprise means for translating the command from the device profile of the target device to the first WLAN protocol or the second RF protocol.

Some further example aspects are provided below.

Aspect 1. A wireless router, comprising: a first radio frequency (RF) modem configured to route traffic among one or more first devices according to a first wireless local area network (WLAN) protocol, wherein the traffic includes Internet protocol traffic and the wireless router is configured to provide Internet access to the one or more first devices; at least one hardware card slot configured to receive an RF modem card configured to communicate according to a second RF protocol with one or more second devices, the RF modem card configured to execute a service application to communicate with the one or more second devices via the second RF protocol; a rules engine configured to: identify first events based on the traffic on the first WLAN protocol; identify second events based on input received from the one or more second devices via the second RF protocol; and generate a command to control a target device of the first devices or the second devices based on a device profile of the target device; and a translation layer configured to: translate the input received from the one or more second devices to a feature of the device profile of the target device; translate the command from the device profile of the target device to the first WLAN protocol or the second RF protocol.

Aspect 2. The wireless router of Aspect 1, wherein the rules engine is configurable via one or more of the first devices with one or more rules defining conditions based on the first events or the second events and defining actions based on commands included in the device profile.

Aspect 3. The wireless router of Aspect 1 or 2, wherein the rules engine includes a machine learning model configured to detect the first event based on a classification of the traffic on the first WLAN protocol.

Aspect 4. The wireless router of any of Aspects 1-3, wherein the rules engine includes a machine learning model configured to detect the first event based on an anomaly in traffic patterns on the first WLAN protocol.

Aspect 5. The wireless router of any of Aspects 1-4, wherein the device profile of the first device includes a feature set selected from generic features applicable to a plurality of devices.

Aspect 6. The wireless router of any of Aspects 1-5, wherein the device profile of the first device identifies an interface with the first RF modem or the RF modem card via which the first device is connected to the wireless router.

Aspect 7. A method of operating a wireless router, comprising: routing traffic among one or more first devices according to a first wireless local area network (WLAN) protocol, wherein the traffic includes Internet protocol traffic and the wireless router is configured to provide Internet access to the one or more first devices; identifying a first event based on the traffic on the first WLAN protocol; receiving input from one or more second devices via a removable RF modem card, wherein the RF modem card is configured to execute a service application to communicate with the one or more second devices via a second RF protocol; translating the input received from the one or more second devices to aa feature of a device profile corresponding to the one or more second devices; identifying a second event based on the feature of the device profile corresponding to the one or more second devices; generating a command to control a target device of the first devices or the second devices based on a device profile of the target device in response to the first event or the second event; and translating the command from the device profile of the target device to the first WLAN protocol or the second RF protocol.

Aspect 8. The method of Aspect 7, further comprising receiving a configuration from one of the first devices with one or more rules defining conditions based on the first event or the second event and defining actions based on commands included in the device profile.

Aspect 9. The method of Aspect 7 or 8, wherein identifying the first event based on the traffic on the first WLAN protocol comprises applying the traffic to a machine learning model configured to detect the first event based on a classification of the traffic on the first WLAN protocol.

Aspect 10. The method of any of Aspects 7-9, wherein identifying the first event based on the traffic on the first WLAN protocol comprises applying the traffic to a machine learning model configured to detect the first event based on an anomaly in traffic patterns on the first WLAN protocol.

Aspect 11. The method of any of Aspects 7-10, wherein the device profile of the target device includes a feature set selected from generic features applicable to a plurality of devices.

Aspect 12. The method of any of Aspects 7-11, wherein the device profile of the target device identifies an interface with the first RF modem or the RF modem card via which the target device is connected to the wireless router.

Aspect 13. A non-transitory computer-readable medium storing instructions executable by a processor of a wireless router, wherein the instructions, when executed, cause to the processor to: route traffic among one or more first devices according to a first wireless local area network (WLAN) protocol, wherein the traffic includes Internet protocol traffic and the wireless router is configured to provide Internet access to the one or more first devices; identify a first event based on the traffic on the first WLAN protocol; receive input from one or more second devices via a removable RF modem card, wherein the RF modem card is configured to execute a service application to communicate with the one or more second devices via a second RF protocol; translate the input received from the one or more second devices to a feature of a device profile corresponding to the one or more second devices; identify a second event based on the feature of the device profile corresponding to the one or more second devices; generate a command to control a target device of the first devices or the second devices based on a device profile of the target device in response to the first event or the second event; and translate the command from the device profile of the target device to the first WLAN protocol or the second RF protocol.

Aspect 14. The non-transitory computer-readable medium of Aspect 13, further comprising instructions to receive a configuration from one of the first devices with one or more rules defining conditions based on the first event or the second event and defining actions based on commands included in the device profile.

Aspect 15. The non-transitory computer-readable medium of Aspect 13 or 14, wherein the instructions to identify the first event based on the traffic on the first WLAN protocol comprise instructions to apply the traffic to a machine learning model configured to detect the first event based on a classification of the traffic on the first WLAN protocol.

Aspect 16. The non-transitory computer-readable medium of any of Aspects 13-15, wherein the instructions to identify the first event based on the traffic on the first WLAN protocol comprise instructions to apply the traffic to a machine learning model configured to detect the first event based on an anomaly in traffic patterns on the first WLAN protocol.

Aspect 17. The non-transitory computer-readable medium of any of Aspects 13-15, wherein the device profile of the target device includes a feature set selected from generic features applicable to a plurality of devices.

Aspect 18. The non-transitory computer-readable medium of any of Aspects 13-15, wherein the device profile of the target device identifies an interface with the first RF modem or the RF modem card via which the target device is connected to the wireless router.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A wireless router, comprising:
   a first radio frequency (RF) modem configured to route traffic among one or more first devices according to a first wireless local area network (WLAN) protocol, wherein the traffic includes Internet protocol traffic and the wireless router is configured to provide Internet access to the one or more wireless devices;
   at least one hardware card slot configured to receive an RF modem card configured to communicate according to a second RF protocol with one or more electronic devices, the RF modem card configured to execute a service application to communicate with the one or more electronic devices via the second RF protocol;
   a rules engine configured to:
      identify first events based on the traffic on the first WLAN protocol;
      identify second events based on input received from the one or more electronic devices via the second RF protocol; and
      generate a command to control a target device of the wireless devices or the second devices based on a device profile of the target device; and
   a translation layer configured to:
      translate the input received from the one or more second devices to a feature of the device profile of the target device; and
      translate the command from the device profile of the target device to the first WLAN protocol or the second RF protocol.

2. The wireless router of claim 1, wherein the rules engine is configurable via one or more of the first devices with one or more rules defining conditions based on the first events or the second events and defining actions based on commands included in the device profile.

3. The wireless router of claim 1, wherein the rules engine includes a machine learning model configured to detect the first event based on a classification of the traffic on the first WLAN protocol.

4. The wireless router of claim 1, wherein the rules engine includes a machine learning model configured to detect the first event based on an anomaly in traffic patterns on the first WLAN protocol.

5. The wireless router of claim 1, wherein the device profile of the first device includes a feature set selected from generic features applicable to a plurality of devices.

6. The wireless router of claim 1, wherein the device profile of the first device identifies an interface with the first RF modem or the RF modem card via which the first device is connected to the wireless router.

7. A method of operating a wireless router, comprising:
   routing traffic among one or more first devices according to a first wireless local area network (WLAN) protocol, wherein the traffic includes Internet protocol traffic and the wireless router is configured to provide Internet access to the one or more first devices;
   identifying a first event based on the traffic on the first WLAN protocol;
   receiving input from one or more second devices via a removable RF modem card, wherein the RF modem card is configured to execute a service application to communicate with the one or more second devices via a second RF protocol;
   translating the input received from the one or more second devices to a feature of a device profile corresponding to the one or more second devices;
   identifying a second event based on the feature of the device profile corresponding to the one or more second devices;
   generating a command to control a target device of the first devices or the second devices based on a device profile of the target device in response to the first event or the second event; and
   translating the command from the device profile of the target device to the first WLAN protocol or the second RF protocol.

8. The method of claim 7, further comprising receiving a configuration from one of the first devices with one or more rules defining conditions based on the first event or the second event and defining actions based on commands included in the device profile.

9. The method of claim 7, wherein identifying the first event based on the traffic on the first WLAN protocol comprises applying the traffic to a machine learning model configured to detect the first event based on a classification of the traffic on the first WLAN protocol.

10. The method of claim 7, wherein identifying the first event based on the traffic on the first WLAN protocol comprises applying the traffic to a machine learning model configured to detect the first event based on an anomaly in traffic patterns on the first WLAN protocol.

11. The method of claim 7, wherein the device profile of the target device includes a feature set selected from generic features applicable to a plurality of devices.

12. The method of claim 7, wherein the device profile of the target device identifies an interface with the first RF modem or the RF modem card via which the target device is connected to the wireless router.

13. A non-transitory computer-readable medium storing instructions executable by a processor of a wireless router, wherein the instructions, when executed, cause to the processor to:
- route traffic among one or more first devices according to a first wireless local area network (WLAN) protocol, wherein the traffic includes Internet protocol traffic and the wireless router is configured to provide Internet access to the one or more first devices;
- identify a first event based on the traffic on the first WLAN protocol;
- receive input from one or more second devices via a removable RF modem card, wherein the RF modem card is configured to execute a service application to communicate with the one or more second devices via a second RF protocol;
- translate the input received from the one or more second devices to a feature of a device profile corresponding to the one or more second devices;
- identify a second event based on the feature of the device profile corresponding to the one or more second devices;
- generate a command to control a target device of the first devices or the second devices based on a device profile of the target device in response to the first event or the second event; and
- translate the command from the device profile of the target device to the first WLAN protocol or the second RF protocol.

14. The non-transitory computer-readable medium of claim 13, further comprising instructions to receive a configuration from one of the first devices with one or more rules defining conditions based on the first event or the second event and defining actions based on commands included in the device profile.

15. The non-transitory computer-readable medium of claim 13, wherein the instructions to identify the first event based on the traffic on the first WLAN protocol comprise instructions to apply the traffic to a machine learning model configured to detect the first event based on a classification of the traffic on the first WLAN protocol.

16. The non-transitory computer-readable medium of claim 13, wherein the instructions to identify the first event based on the traffic on the first WLAN protocol comprise instructions to apply the traffic to a machine learning model configured to detect the first event based on an anomaly in traffic patterns on the first WLAN protocol.

17. The non-transitory computer-readable medium of claim 13, wherein the device profile of the target device includes a feature set selected from generic features applicable to a plurality of devices.

18. The non-transitory computer-readable medium of claim 13, wherein the device profile of the target device identifies an interface with the first RF modem or the RF modem card via which the target device is connected to the wireless router.

* * * * *